E. E. WICKERSHAM.
DUSTPROOF AND ADJUSTABLE BEARING MOUNTING.
APPLICATION FILED JAN. 29, 1919.
1,365,429.
Patented Jan. 11, 1921.
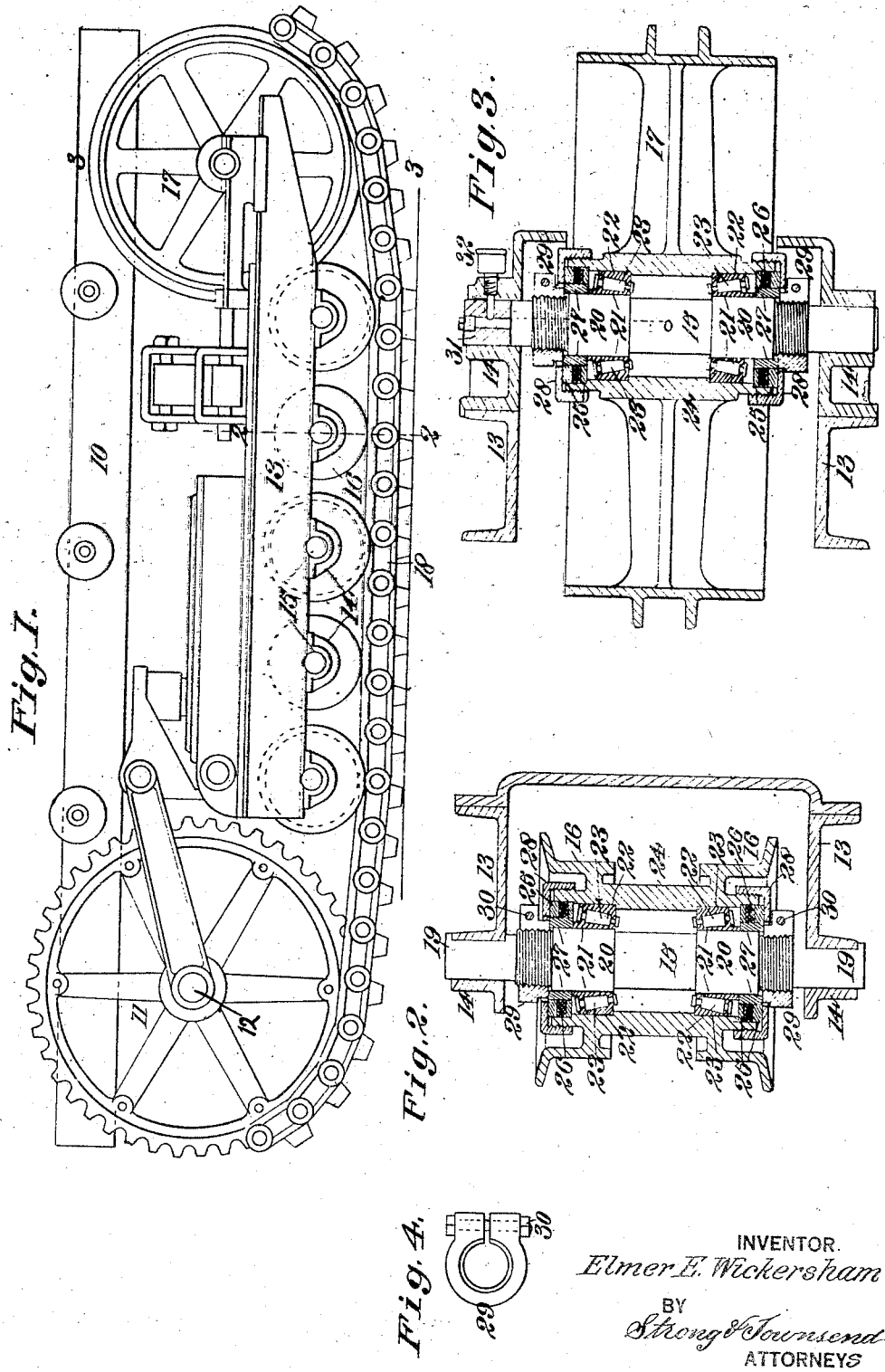
INVENTOR.
Elmer E. Wickersham
BY
Strong & Townsend
ATTORNEYS

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

DUSTPROOF AND ADJUSTABLE BEARING MOUNTING.

1,365,429.  Specification of Letters Patent.  Patented Jan. 11, 1921.

Application filed January 29, 1919. Serial No. 273,739.

*To all whom it may concern:*

Be it known that I, ELMER E. WICKERSHAM, a citizen of the United States, residing at Stockton, in the county of San Joaquin and State of California, have invented new and useful Improvements in Dustproof and Adjustable Bearing Mountings, of which the following is a specification.

This invention relates to a tractor construction, and particularly pertains to an axle bearing for the wheels thereof.

It is the principal object of this invention to provide a bearing which may be incorporated within the hubs of vehicle axles and which bearing is so constructed as to exclude dirt and foreign particles therefrom and at the same time will act effectively to retain the grease upon the moving parts thereof, said bearing being furthermore provided with means for adjusting the anti-friction bearings incorporated therein without removing the axle from the wheel.

The present invention essentially consists of an axle, upon the opposite ends of which are mounted anti-friction bearings; these bearings being circumscribed by the hub of a wheel, said hub being provided with combined packing and tightening means which will adjustably engage the inner raceway of the anti-friction bearings and will completely close the ends of the hubs.

The invention is illustrated by way of example in the accompanying drawings, in which—

Figure 1 is a view in side elevation, illustrating a fragmentary portion of a tractor truck disclosing the application of the present invention thereto.

Fig. 2 is a view in vertical section through one of the load-supporting rollers of the truck, as seen on the line 2—2 of Fig. 1.

Fig. 3 is a view in vertical section through the idler wheel of the truck, as shown on line 3—3 of Fig. 1.

Fig. 4 is a view of one of the clamping collars disassociated from the axle upon which it is used.

Reference being had to Fig. 1 of the drawing, 10 indicates a tractor main frame adapted to be supported along its opposite sides by chain track truck units. It is to be understood that the present invention is not limited to this class of vehicles but is merely shown in this connection by way of example.

The chain track units consist of driving sprockets 11 mounted on a suitable axle 12, fixed in bearings, to the main frame. Disposed in front of these driving sprockets and suitably connected with the main frame are truck frames 13. These frames are provided with bearings 14, along their lower edges, to receive the axles 15 of load-supporting rollers 16. One of these rollers is shown in detail in Fig. 2 of the drawings and will be further described. Mounted upon the forward ends of the truck frames are idler wheels 17, one of which is shown in Fig. 3. The driving sprockets 11, idler wheels 17 and the truck frames are embraced by a chain track 18.

The axle 15 is held against rotation within its bearings, as shown in Fig. 2, and has opposite ends 19 which are fixed within the bearings 14. The central portion of the axle 15 is formed with enlarged cylindrical sections 20, which are spaced in relation to each other and are designed to receive the inner cups 21 of anti-friction bearing structures. In the present instance these cups are designed to receive tapered roller bearings 22, which bearings are in turn circumscribed by outer bearing cups 23. The outer cups are seated within counterbores formed in the hub 24 of the track rollers 16. These counterbores form inner shoulders which limit the inward movement of the cups 23 and thus form a substantial seat for the same.

A second enlarged counterbore is formed around the mouth of the opening in each end of the hub and is adapted to receive a pair of metal washers 25, between which is disposed a packing washer 26, preferably formed of felt or other fibrous material. The washers are formed with an enlarged central bore corresponding to the outer diameter of a spacing sleeve 27 which fits directly upon the enlarged portion 20 at each end of the shaft and bears directly against the outer end of each of the inner cups 21.

The packing washers 25 and 26 fit over the outside circumference of the sleeves 27. Dust caps 28 are provided which are internally threaded to fit upon the threaded exterior of the hub ends. These caps have an annular flange overhanging the end of the hub and bearing against the outermost of the washers 25. By adjustment of the caps 28 variable pressure may be exerted upon the various packing washers and thus clamp them against the inner shoulder formed by the counterbore within which they are seated.

Adjacent to the outer ends of the enlarged portions 20 of the shaft are threaded portions which receive the clamping collars 29. One of the clamping collars is shown in Fig. 4 as having a split side adapted to be drawn together by a lock bolt 30; the central opening through the collar being threaded to register with the threads upon the ends of the shaft 15. By rotation of this collar any desired pressure may be exerted upon the spacing sleeve 27 and will force the inner cup 21 against the inclined sides of the rollers 22, thus tightening them.

The construction of the bearings utilized in the idler wheel 17 is identical with that previously described except that the central oil gland 31 is formed partially through the shaft and provided with an outlet within the hub and between the two bearings. This oil gland is fed by an oil cup 32 mounted in the hub of the axle bearing.

In the operation of either type of wheel the bearings are mounted in position and thereafter sealed by means of the packing washers 25 and 26 which are then held in place by the dust caps 28. Proper adjustment of the bearings may then be effected by the collars 29. The packing washers may also be tightened by rotation of the dust caps previously described. It will thus be seen that when either of the bearings becomes worn, it may be tightened without removing the axle from the hub of the wheel and the dust caps accordingly adjusted, thus providing a convenient and practical method of packing the bearings and providing for their proper adjustment during the operation of the vehicle.

While I have shown the preferred form of my invention, it will be understood that various changes in the construction, combination and arrangement of parts may be made by those skilled in the art without departing from the spirit of the invention as claimed.

Having thus described my invention, what I claim and desire to secure by Letters Patent is—

1. In a bearing structure, an axle, anti-friction bearings carried thereby, a tubular wheel hub inclosing said bearings and forming a positive seat for the outer element of said bearings, dust and oil proof washers adapted to be mounted within the ends of the hub, means for variably clamping said washers in position and means for adjusting the bearings from a point exterior of said washers.

2. In a bearing structure, an axle, anti-friction bearings carried thereby, a tubular wheel hub inclosing said bearings and forming a positive seat for the outer element of said bearings, dust and oil proof washers adapted to be mounted within the ends of the hub, means for variably clamping said washers in position, adjusting sleeves and lock collars carried by the axle, whereby the bearings may be adjusted without molesting the washers.

3. A bearing structure comprising a fixed axle, anti-friction bearings carried by said axle, a tubular wheel hub circumscribing the bearings and formed with seats, against which the outer parts of the bearings may rest, a counterbore formed within the ends of the hub, packing washers adapted to be mounted within said counterbore, an annular threaded dust cap adapted to be secured over each end of the hub, an adjusting sleeve adapted to bear against the inner element of the anti-friction bearing and lock collars carried by the axle and adapted to exert pressure against said sleeves to adjust the bearings.

4. In a bearing structure, a tubular wheel hub formed at its opposite ends with stepped counterbores, anti-friction bearings having inner and outer cups and intermediate roller members, the outer cups being mounted within the smaller of said counterbores and resting with their inner faces against the annular shoulders thereof, an axle extending through the hub and supporting the inner cups of said bearings, slidable adjusting sleeves mounted upon said axles and bearing against the outer ends of said inner cup members, lock nuts carried on said axles and adapted to variably bear against said adjusting sleeves, a plurality of packing washers mounted around said adjusting sleeves and within the outer counterbores of the hub and dust caps adjustably positioned upon the opposite ends of the hub and provided to variably clamp the packing washers without interfering with the adjustment of the bearing, by means of the adjusting sleeves and the lock nuts.

In testimony whereof I have hereunto set my hand in the presence of two subscribing witnesses.

ELMER E. WICKERSHAM.

Witnesses:
 DAVID B. LYMDET.
 GEORGE A. DITZ.